United States Patent [19]

O'Brien

[11] Patent Number: 4,622,146

[45] Date of Patent: Nov. 11, 1986

[54] FLEXIBLE PAINT STRAINER

[76] Inventor: Robert O'Brien, 2326 Hillgard Ave., Berkeley, Calif. 94709

[21] Appl. No.: 763,316

[22] Filed: Aug. 6, 1985

Related U.S. Application Data

[63] Continuation of Ser. No. 517,211, Jul. 25, 1983, abandoned.

[51] Int. Cl.⁴ .............................................. B01D 25/04
[52] U.S. Cl. .................................. 210/469; 210/474; 210/479; 210/506
[58] Field of Search ............... 210/455, 464, 473, 474, 210/477, 479, 478, 482, 483, 497.3, 506, 504, 469

[56] References Cited

U.S. PATENT DOCUMENTS

| | | | |
|---|---|---|---|
| 491,421 | 2/1893 | Gersdorff | 210/477 |
| 871,285 | 11/1907 | Martin | 210/477 |
| 1,590,572 | 6/1926 | Fredette | 210/471 |
| 2,315,842 | 4/1943 | Dariano | 210/474 |
| 2,436,924 | 3/1948 | Hansen | 210/251 |
| 2,896,788 | 7/1959 | Hoffberger | 210/477 |
| 3,815,646 | 6/1974 | Coakley | 210/473 |
| 3,912,638 | 10/1975 | Beaubien | 210/455 |

Primary Examiner—Richard V. Fisher
Assistant Examiner—Wanda L. Millard
Attorney, Agent, or Firm—Bielen and Peterson

[57] ABSTRACT

A disposable paint strainer formed of a sleeve of flexible polyethylene narrowing toward an end and a nylon mesh straining element mounted across the interior of the sleeve at the narrower end in spaced relation above such end so as to provide a skirt capable of protecting the hands of the user from contacting paint forced through the straining element by pressing the portion of the sleeve above the straining element.

8 Claims, 3 Drawing Figures

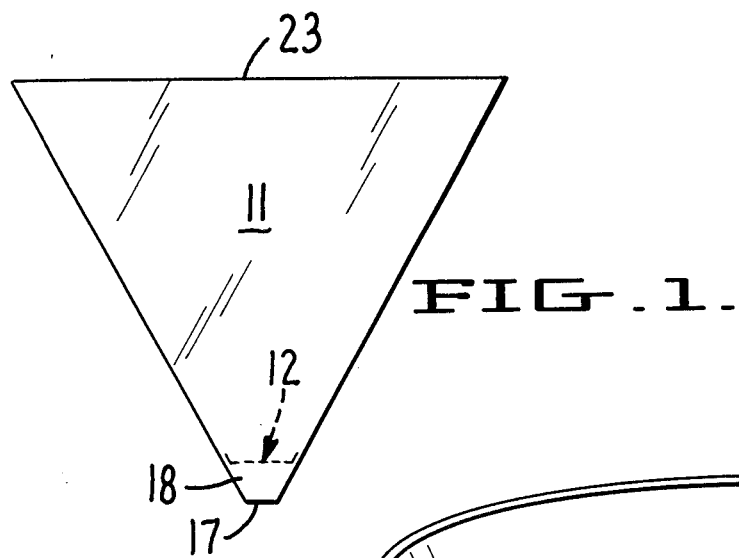
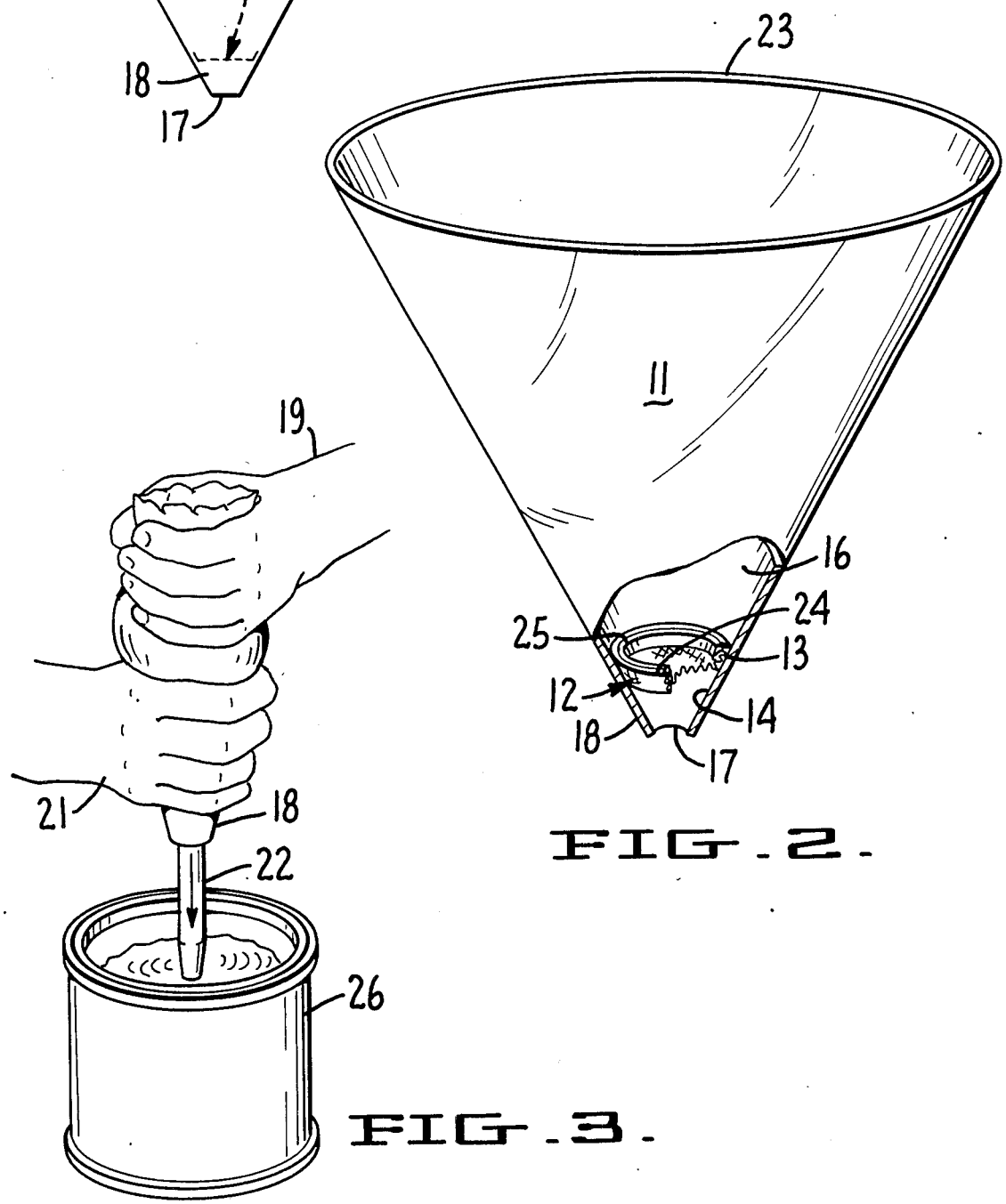

FLEXIBLE PAINT STRAINER

This is a continuation of co-pending application Ser. No. 517,211, filed on July 25, 1983, now abandoned.

BACKGROUND OF THE INVENTION

1. Field of the Invention

This invention relates to a paint strainer, and more particularly to devices for forcing paint through a strainer to remove non-liquid lumps and impurities.

2. Description of the Prior Art

Previously known devices for straining lumps and particles from paint have relied entirely on the force of gravity to cause the paint being strained to flow through a perforate material. For example, see U.S. Pat. No. 2,436,924 issued to E. F. Hansen on Mar. 2, 1948. The Hansen strainer is a rigid perforated member mountable on the rim of the paint can and extending over a fairly large portion of the can. The Hansen paint strainer is nondisposable and accordingly must be cleaned after each use.

Attempts have been made to provide a disposable straining element, as by using a piece of cloth for the straining element and mounting the cloth across the opening of a paint can, as shown in U.S. Pat. No. 2,315,842 issued to A. Dariano on Apr. 6, 1943 and U.S. Pat. No. 1,994,335 issued to J. Churan on Mar. 12, 1935. While these straining elements may be discarded, and hence do not have to be cleaned, their supporting structures do and they must cover the entire opening of the paint can (Dariano) or at least a major portion thereof (Churan) in order to provide sufficient filtering area for the liquid paint to sink through the strainer element solely under the force of gravity.

A variation on the concept of straining paint (or varnish) through a cloth is disclosed in U.S. Pat. No. 1,590,572 issued to A. Fredette on June 29, 1926, this device being a separate cup adapted to hook over the rim of a can or the like and having a replaceable strainer cloth providing the bottom of the cup.

SUMMARY OF THE INVENTION

The paint strainer of the present invention provides a more effective paint straining action by permitting the user to grasp the device and force the paint through the paint straining element. This makes it possible to accomplish effective straining through a paint straining element of much smaller area than the straining elements used in gravity flow paint straining devices.

The paint strainer of the present invention does not require the use of other special supporting equipment, such as paint cans, clamps, cups and the like. The structural configuration of the device permits the user to grasp the filled paint strainer in his hands and squeeze the flexible walls of the device to exert pressure on the paint and cause it to flow through the paint straining element.

The present paint strainer is readily and inexpensively made of inexpensive materials making it completely disposable after each use if desired, and may be flattened out so as to require minimum storage space until used. Moreover, the paint straining element is located in the device in such manner as to provide a skirt below the straining element which functions to keep the strained paint from being deposited on the hands of the user as the squeezing action progresses. Also, the device may be rolled up after being used to keep the paint on the strainer element and walls of the device from drying, thus keeping the device in condition for repeated use.

It is therefore an object of the present invention to provide a paint strainer in which the paint to be strained is forced under pressure through a straining element to drop therefrom into a suitable container without contacting the hands of the user.

Another object of the present invention is to provide a paint strainer of the character described which may be cheaply and readily formed of inexpensive materials so as to be completely disposable after being used.

A further object of the invention is to provide a disposable paint strainer of the character described which is entirely self contained and requires no additional apparatus to perform its function.

A still further object of the invention is to provide a disposable paint strainer of the character described which can be flattened out and stacked to occupy minimum storage space until used.

Another object of the invention is the provision of a device of the character set forth which may be rolled up to keep the straining element from drying out during interruptions in use.

Other objects and features of advantage will become apparent as the specification progresses and from the claims.

BRIEF DESCRIPTION OF THE DRAWINGS

FIG. 1 is a side elevational view of a disposable paint strainer constructed in accordance with the present invention.

FIG. 2 is a perspective view of the disposable paint strainer of FIG. 1 opened out into operative position, with a portion thereof being broken away and shown in section for clarity of illustration.

FIG. 3 is a perspective view of the disposable paint strainer of FIGS. 1 and 2 in actual use to strain paint into a receptacle.

While only the preferred form of the invention is illustrated in the drawings, it will be apparent that various modifications could be made without departing from the ambit of the claims.

DESCRIPTION OF THE PREFERRED EMBODIMENT

As may be seen in the accompanying drawing, the disposable paint strainer of the present invention includes a sleeve 11 of limp and flexible material which is readily deformable and impermeable to paint and a readily deformable and flexible, paint straining perforate element secured at its periphery 13 to the inner surface 14 of the sleeve 11, with the portion of sleeve 11 above the perforate element 12 defining with element 12 a pocket 16 for receiving paint to be strained, the perforate element 12 being positioned in spaced relation to the end 17 of sleeve 11 opposite to pocket 16 so as to cause the sleeve to provide a skirt 18 formed for keeping the hands, 19 and 21, of the user from contacting paint 22 forced through the element 12.

In accordance with the present invention, the sleeve 11 is formed of thin, flexible sheet plastic such as polyethylene, of a guage or thickness providing sufficient strength to contain the paint under pressure while still being flexible enough to permit squeezing of the paint through the strainer element in the manner depicted in FIG. 3 of the drawings. I have found that polyethylene of from about 2 mils to about 4 mils thickness will provide the desired characteristics.

As may best be seen in FIGS. 1 and 2 of the drawings, the sleeve 11 is preferably of tapered configuration wider at its upper end 23 (the end adjacent to pocket 16) and narrower at the perforate element 12. This construction provides a large opening into which the paint to be strained may be poured and a relatively small area straining element 12, thus reducing the cost of manufacture by reducing the quantity of paint straining material required while, at the same time, making it easier to flatten out the device (FIG. 1) for compact storage.

The flexible, paint straining perforate element 12 may be of any suitable material capable of providing the desired straining action and capable of being fabricated in the manner described. Nylon mesh construction lends itself well to fabrication of the device and is flexible enough so the device may be substantially flattened for storage. The flexible paint straining perforate element 12 is secured to bridge the space between the inner surfaces 14 of the sleeve 11 at a spaced distance above the lower, narrower sleeve end 17, thus providing the protective skirt 18. It should be noted that the area of the straining element 12 is small compared to the capacity of the device, and the mesh is comparatively fine so as to retain paint until the sleeve 11 is pressed in the manner shown in FIG. 3. Thus, the device can be placed in an empty bucket for convenience in pouring, and shifted therefrom, without spilling paint.

The paint strainer of the present invention may be provided in a variety of sizes. A suitable size, as here shown, provides a sleeve approximately eleven inches long and approximately 13 inches wide (when flattened) at its upper end 23. The sleeve 11 narrows down from upper end 23 to lower end 17, with lower end 17 being approximately ¾ inch across when the sleeve 11 is flattened. In this configuration, the straining element 12 is located approximately 1 inch above the end 17.

The peripherial area 13 of the paint straining element 12 may conveniently be turned up to provide a flange 24 in the manner illustrated in FIG. 2 of the drawings, or the flange could be turned downwardly if desired. While a simple disk of the nylon mesh could be used, sealing of its periphery to the inner surface 14 of sleeve 11 could prove to be difficult. The construction illustrated in FIG. 2 of the drawings is readily provided by placing an oversize disk of nylon mesh on a truncated conical member (not shown). The sleeve 11 is then inverted and pulled downwardly over the nylon mesh disk until it assumes the position and configuration illustrated in FIGS. 1 and 2 of the drawing. The peripheral area 13 of element 12 (the outer surface of flange 24) is then securely attached to the inner surface 14 of sleeve 11.

Attachment may be accomplished by any suitable means, such as chemical bonding with a glue or other bonding agent compatible with both nylon and polyethylene but preferably a ring of polyethylene 25 is positioned within flange 24 so that, when heat is applied, the molten polyethylene will weld together through the nylon mesh. Alternatively, the flange 24 may be sewn to the sleeve 11 in the desired position, thereby forming a mechanical bond.

In use, the sleeve 11 is open to the position shown in FIG. 2 and a quantity of paint is poured into pocket 16. For ease of handling, sleeve 11 may be supported in a can or pan or on a board while paint is poured in. The user then gathers the upper edge 23 of sleeve 11 together in the manner shown in FIG. 3 and holds it tightly. The filled sleeve is then lifted over a suitable receptacle, and lower hand 21 of the user is then used to squeeze the body of sleeve 11 so as to force the paint 22 through the straining element 12, from whence it may fall into a suitable container 26. As this squeezing operation is being accomplished, the skirt 18 extending below the hand 21 protects the hand from contacting the paint 22.

From the foregoing, it will be apparent that the disposable paint strainer of the present invention is "No-Mess" and accomplishes a rapid and positive paint straining action while protecting the hands of the user from accidental contact with the paint being strained. The device of the present invention is easy and simple to manufacture, can accomodate interruptions in use without drying, may be folded flat for compact storage until use, and is made of inexpensive materials, so as to make it readily disposable.

What is claimed is:

1. A disposable paint strainer, comprising a sleeve of limp, flexible readily deformable material impermeable to paint and thin enough to be folded flat and secured by a rubber band when not in use for straining and a flexible, readily deformable, paint straining perforate element chemically bonded and secured continuously around its periphery to the inner surface of said sleeve with the portion of the sleeve above said perforate element defining with said perforate element a pocket for receiving the paint to be strained, said sleeve being formed for manual gripping together at its top and manual squeezing to force paint from said pocket out through the bottom end of said sleeve, said perforate element being positioned in spaced relation to the end of said sleeve opposite to said pocket so as to cause said sleeve to provide a skirt extending below said perforate element for keeping the hands of the user from contacting paint forced through said paint straining perforate element.

2. Apparatus as described in claim 1 and wherein said sleeve is formed of thin, flexible sheet plastic.

3. Apparatus as described in claim 2 and wherein said flexible paint straining perforate element is formed of nylon.

4. Apparatus as described in claim 3 and wherein said flexible paint straining perforate element is formed of nylon mesh.

5. Apparatus as described in claim 4 and wherein the peripheral area of said perforate element is heat sealed to the inner surface of said sleeve.

6. Apparatus as described in claim 2 and wherein said sleeve is formed of polyethylene of from about 2 mils thickness to about 4 mils thickness.

7. Apparatus as described in claim 1 and wherein said sleeve is of tapered configuration wider at its end adjacent to said pocket and narrower at said perforate element.

8. Apparatus as described in claim 1 and wherein said sleeve narrows from its end adjacent to said pocket toward its opposite end.

* * * * *